(12) United States Patent
Klacar et al.

(10) Patent No.: US 11,029,748 B2
(45) Date of Patent: Jun. 8, 2021

(54) ADAPTIVE PERIPHERAL COMPONENT INTERCONNECT EXPRESS LINK SUBSTATE INITIATION FOR OPTIMAL PERFORMANCE AND POWER SAVINGS

(71) Applicant: QUALCOMM Incorporated, San Diego, CA (US)

(72) Inventors: Neven Klacar, Encinitas, CA (US); Muralidhar Krishnamoorthy, San Diego, CA (US); Hariharan Sukumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 561 days.

(21) Appl. No.: 15/070,381

(22) Filed: Mar. 15, 2016

(65) Prior Publication Data

US 2017/0269675 A1    Sep. 21, 2017

(51) Int. Cl.
*G06F 1/3234* (2019.01)
*G06F 1/3206* (2019.01)
(Continued)

(52) U.S. Cl.
CPC .......... *G06F 1/3278* (2013.01); *G06F 1/3206* (2013.01); *G06F 1/3215* (2013.01);
(Continued)

(58) Field of Classification Search
CPC .. G06F 1/32; G06F 2213/0026; G06F 1/3253; G06F 1/3287; G06F 13/4282;
(Continued)

(56) References Cited

U.S. PATENT DOCUMENTS

| 7,734,942 B2 | 6/2010 | Dahlen et al. |
| 9,015,396 B2 | 4/2015 | Murphy et al. |

(Continued)

FOREIGN PATENT DOCUMENTS

| CN | 103765345 A | 4/2014 |
| CN | 104050125 A | 9/2014 |

(Continued)

OTHER PUBLICATIONS

PCI Express Base Specification, Revision 3.0, published Nov. 10, 2010, accessed at http://composter.com.ua/documents/PCI_Express_Base_Specification_Revision_3.0.pdf.*

(Continued)

*Primary Examiner* — Faisal M Zaman
(74) *Attorney, Agent, or Firm* — Loza & Loza, LLP

(57) ABSTRACT

Systems, methods, and apparatus for adaptively modifying latency times governing entry of a PCIe interface into low power states are described. A method performed by a controller of a PCIe interface includes determining that a burst of data is being transmitted on a PCIe link, configuring a timer to signal when an entry latency period has elapsed after determining that a PCIe link has entered an idle state, causing one or more circuits of the PCIe interface to enter a low-power state when the timer signals that the entry latency period has elapsed before the PCIe link becomes active, and increasing the entry latency period when a number of entries of the PCIe interface to the low-power state that occurs during transmission of the burst of data exceeds a threshold maximum number.

30 Claims, 8 Drawing Sheets

(51) Int. Cl.
*G06F 13/42* (2006.01)
*G06F 1/3237* (2019.01)
*G06F 1/3215* (2019.01)
*G06F 13/10* (2006.01)
*G06F 13/28* (2006.01)
*G06F 13/40* (2006.01)

(52) U.S. Cl.
CPC .......... *G06F 1/3237* (2013.01); *G06F 1/3253* (2013.01); *G06F 13/102* (2013.01); *G06F 13/28* (2013.01); *G06F 13/4068* (2013.01); *G06F 13/4291* (2013.01); *G06F 13/4295* (2013.01); *G06F 2213/0026* (2013.01); *Y02D 10/00* (2018.01)

(58) Field of Classification Search
CPC .... G06F 1/3228; G06F 1/3293; G06F 1/3243; G06F 1/3278; G06F 1/3296; G06F 1/3203; G06F 1/26; G06F 1/3237; G06F 1/325; G06F 13/4221; G06F 1/3234; Y02D 10/00; Y02D 30/50; Y02D 30/70
USPC ......... 713/323, 320, 300, 310, 324; 710/313
See application file for complete search history.

(56) References Cited

U.S. PATENT DOCUMENTS

| | | | | |
|---|---|---|---|---|
| 9,141,176 | B1* | 9/2015 | Chen | G11B 19/06 |
| 9,146,892 | B2 | 9/2015 | Lindsay | |
| 9,864,422 | B1* | 1/2018 | Ramamurthy | G06F 1/32 |
| 2007/0050653 | A1* | 3/2007 | Verdun | G06F 1/3228 713/320 |
| 2008/0288798 | A1* | 11/2008 | Cooper | G06F 1/3228 713/322 |
| 2009/0172441 | A1* | 7/2009 | Kant | G06F 1/3228 713/323 |
| 2009/0187779 | A1 | 7/2009 | Liu et al. | |
| 2011/0283128 | A1* | 11/2011 | Farhan | G06F 1/3215 713/324 |
| 2013/0007489 | A1* | 1/2013 | Unnikrishnan | G06F 1/3296 713/320 |
| 2013/0195210 | A1* | 8/2013 | Swarbrick | H04L 25/02 375/259 |
| 2014/0281668 | A1* | 9/2014 | He | G06F 11/0706 714/4.5 |
| 2015/0248363 | A1* | 9/2015 | Dumoulin | G06F 13/28 710/308 |
| 2015/0327167 | A1* | 11/2015 | Ljung | H04W 24/02 370/311 |
| 2017/0024002 | A1* | 1/2017 | Tzafrir | G06F 1/3275 |

FOREIGN PATENT DOCUMENTS

| | | |
|---|---|---|
| CN | 104246652 A | 12/2014 |
| CN | 102662458 B | 7/2015 |
| WO | WO-2013162512 A1 | 10/2013 |

OTHER PUBLICATIONS

Knowlton S., "Using L1 Sub-States to Reduce Power Consumption in PCI Express-Based Devices," DesignWare Technical Bulletin, Retrieved dated on Dec. 15, 2015, and Retrieved from the Internet URL: <a href="https://www.synopsys.com/Company/Publications/DWTB/Pages/dwtb-L1-substates-fall2012.aspx">https://www.synopsys.com/Company/Publications/DWTB/Pages/dwtb-L1-substates-fall2012.aspx</a>, 2 pages.
Kwa S., et al., "PCI Express* Architecture Power Management," Intel Research and Development, Rev 1.1, white Paper—Nov. 8, 2002, 15 pages.
International Search Report and Written Opinion—PCT/US2017/018219—ISA/EPO—dated Apr. 7, 2017.

* cited by examiner

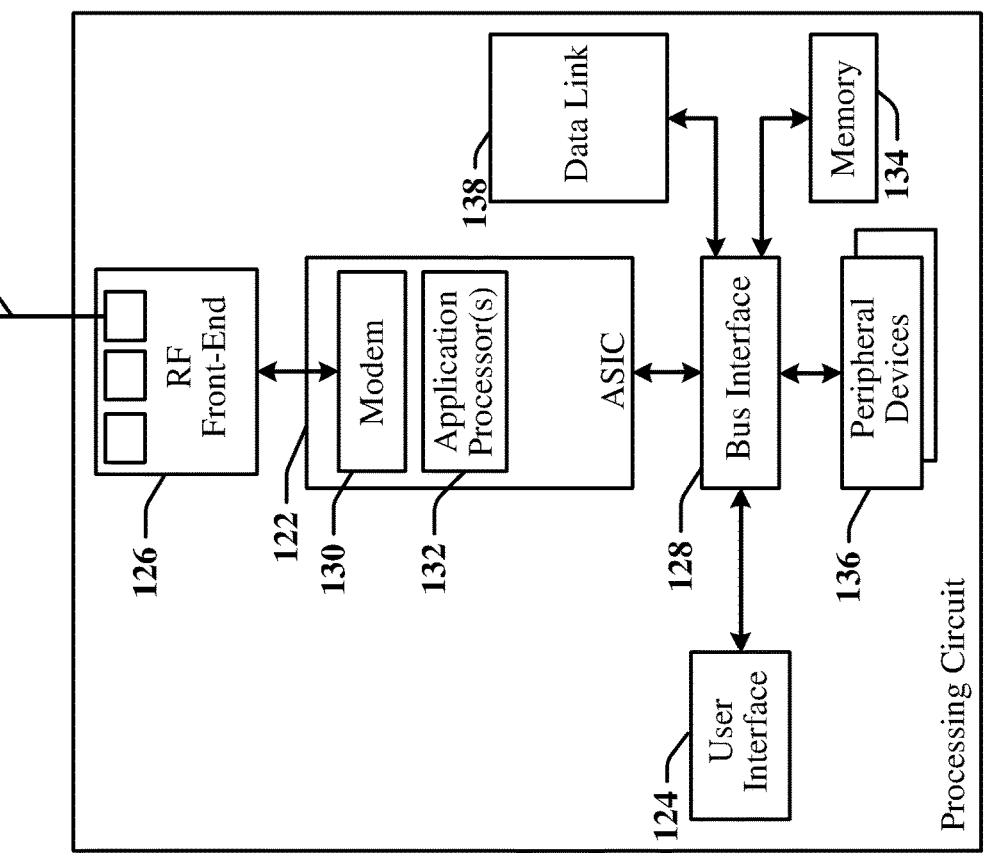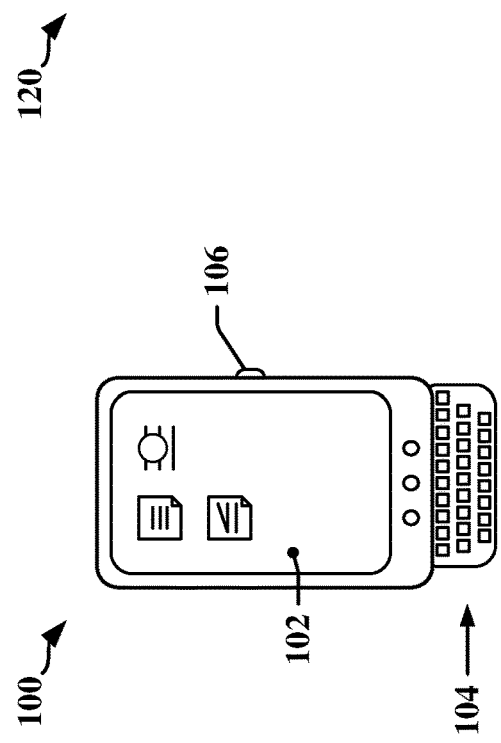
FIG. 1

ADAPTIVE PERIPHERAL COMPONENT INTERCONNECT EXPRESS LINK SUBSTATE INITIATION FOR OPTIMAL PERFORMANCE AND POWER SAVINGS

TECHNICAL FIELD

The present disclosure relates generally to peripheral communications interfaces, and more particularly to techniques for managing power states of a Peripheral Component Interconnect Express interface.

BACKGROUND

Mobile communication devices may include a variety of components including circuit boards, integrated circuit (IC) devices and/or System-on-Chip (SoC) devices. The components may include processing circuits, user interface components, storage and other peripheral components. Communication between components may be implemented using a bus operated in compliance standards-defined specifications and protocols. In one example, the Peripheral Component Interconnect Express (PCIe) interface provides a shared parallel bus architecture that supports interconnection of two devices using links that include one or more serial, full-duplex lanes.

Battery-operated devices, including certain mobile communication devices, are typically designed to meet increasingly tighter power consumption budgets in order to maximize battery lifetime. The PCIe interface supports power management schemes that disable and/or power-down bus interface circuits to conserve power when a PCIe link is idle. These power management schemes can introduce significant data communication latencies related to the time required to enter and exit low-power states. As applications generate continuously-increasing demand for improved communication capabilities including higher data rates, lower data transmission latencies and improved battery lifetime conservation, there exists an ongoing need for improved power management schemes.

SUMMARY

Certain aspects of the disclosure relate to systems, apparatus, methods and techniques that adaptively modify latency times governing entry of a PCIe interface into low power states based on link activity and data flow characteristics. The criteria governing decisions to enter low-power link states can be adaptively modified to optimize power management as link utilization varies.

In various aspects of the disclosure, a method performed by a controller of a PCIe interface includes determining that a burst of data is being transmitted on a PCIe link, configuring a timer to signal when an entry latency period has elapsed after determining that a PCIe link has entered an idle state, causing one or more circuits of the PCIe interface to enter a low-power state when the timer signals that the entry latency period has elapsed before the PCIe link becomes active, and increasing the entry latency period when a number of entries of the PCIe interface to the low-power state that occurs during transmission of the burst of data exceeds a threshold maximum number.

The entry latency period may be increased by doubling the entry latency period. The method may include decreasing the entry latency period when the PCIe interface does not enter the low-power state during transmission of the burst of data. The method may include decreasing the entry latency period when the number of entries of the PCIe interface to the low-power state that occurs during transmission of the burst of data is less than a threshold minimum number. In one example, the entry latency period may be decreased by halving the entry latency period. In another example, the entry latency period may be decreased by restoring a previous time period used for the entry latency period.

In some instances, circuits of the PCIe interface may enter the low-power state when one or more circuits of a transceiver coupled to the PCIe interface are disabled. In some instances, circuits of the PCIe interface may enter the low-power state when a clock signal used by one or more circuits of the PCIe interface is gated or disabled. In some instances, circuits in two or more devices coupled to the PCIe interface to enter the low-power state when the timer signals that the entry latency period has elapsed before the PCIe link becomes active.

In various aspects of the disclosure, an apparatus includes a PCIe interface adapted to couple the apparatus to a PCIe link, and a controller. During a burst of data transmitted on a PCIe link, the controller may be configured to determine when the PCIe link has entered an idle state, enable a timer adapted to signal when an entry latency period has elapsed after determining that the PCIe link has entered the idle state, cause one or more circuits of the PCIe interface to enter a low-power state when the timer signals that the entry latency period has elapsed before the PCIe link becomes active, and increase the entry latency period when a number of entries of the PCIe interface to the low-power state that occurs during transmission of the burst of data exceeds a threshold maximum number.

The entry latency period may be increased by doubling the entry latency period. The controller may be configured to decrease the entry latency period when the PCIe interface does not enter the low-power state during transmission of the burst of data. The controller may be configured to decrease the entry latency period when the number of entries of the PCIe interface to the low-power state that occurs during transmission of the burst of data is less than a threshold minimum number. In one example, the entry latency period may be decreased by halving the entry latency period. In another example, the entry latency period may be decreased by restoring a previous time period used for the entry latency period.

In some instances, the controller may be configured to cause certain circuits of the PCIe interface to enter the low-power state by disabling one or more circuits of a transceiver coupled to the PCIe interface. In some instances, the controller may be configured to cause certain circuits of the PCIe interface to enter the low-power state by disabling or gating a clock signal used by the circuits of the PCIe interface. In some instances, the controller may be configured to cause two or more devices coupled to the PCIe interface to enter the low-power state when the timer signals that the entry latency period has elapsed before the PCIe link becomes active.

In various aspects of the disclosure, an apparatus includes means for managing power consumption in a PCIe interface and configured to transition the PCIe interface between at least a first state and a second state, means for configuring a timer that is adapted to signal when an entry latency period has elapsed after determining that a PCIe link has entered an idle state during a burst of data transmitted on a PCIe link, and means for modifying the entry latency period based on a number of entries of the PCIe interface to the low-power state that occurs during transmission of the burst of data. The means for managing power consumption may be configured to cause one or more circuits of the PCIe interface to enter a low-power state when the timer signals that the entry latency period has elapsed before the PCIe link becomes active.

The entry latency period may be increased by doubling the entry latency period. The means for modifying the entry latency period may be configured to decrease the entry latency period when the PCIe interface does not enter the low-power state during transmission of the burst of data. The means for modifying the entry latency period may be configured to decrease the entry latency period when the number of entries of the PCIe interface to the low-power state that occurs during transmission of the burst of data is less than a threshold minimum number. In one example, the entry latency period is decreased by halving the entry latency period. In another example, the entry latency period is decreased by restoring a previous time period used for the entry latency period.

In some instances, certain circuits of the PCIe interface may enter the low-power state when one or more circuits of a transceiver coupled to the PCIe interface are disabled. In some instances, circuits of the PCIe interface enter the low-power state when a clock signal used by one or more circuits of the PCIe interface is disabled or gated. In some instances, circuits in two or more devices coupled to the PCIe interface to enter the low-power state when the timer signals that the entry latency period has elapsed before the PCIe link becomes active.

In various aspects of the disclosure, a processor readable storage medium is disclosed. The storage medium may be a non-transitory storage medium and may store code that, when executed by one or more processors, causes the one or more processors to determine that a burst of data is being transmitted on a PCIe link, configure a timer to signal when an entry latency period has elapsed after determining that a PCIe link has entered an idle state, cause one or more circuits of the PCIe interface to enter a low-power state when the timer signals that the entry latency period has elapsed before the PCIe link becomes active, and increase the entry latency period when a number of entries of the PCIe interface to the low-power state that occurs during transmission of the burst of data exceeds a threshold maximum number.

The entry latency period may be increased by doubling the entry latency period. The instructions may cause the one or more processors to decrease the entry latency period when the PCIe interface does not enter the low-power state during transmission of the burst of data. The instructions may cause the one or more processors to decrease the entry latency period when the number of entries of the PCIe interface to the low-power state that occurs during transmission of the burst of data is less than a threshold minimum number. In one example, the entry latency period may be decreased by halving the entry latency period. In another example, the entry latency period may be decreased by restoring a previous time period used for the entry latency period.

In some instances, certain circuits of the PCIe interface may enter the low-power state when a transceiver coupled to the PCIe interface is disabled. In some instances, circuits of the PCIe interface may enter the low-power state when a clock signal used by one or more circuits of the PCIe interface is gated or disabled. In some instances, circuits of two or more devices coupled to the PCIe interface may enter the low-power state when the timer signals that the entry latency period has elapsed before the PCIe link becomes active.

BRIEF DESCRIPTION OF THE DRAWINGS

FIG. 1 illustrates one example of an apparatus that may be adapted according to certain aspects disclosed herein.

DETAILED DESCRIPTION

Figure 2:
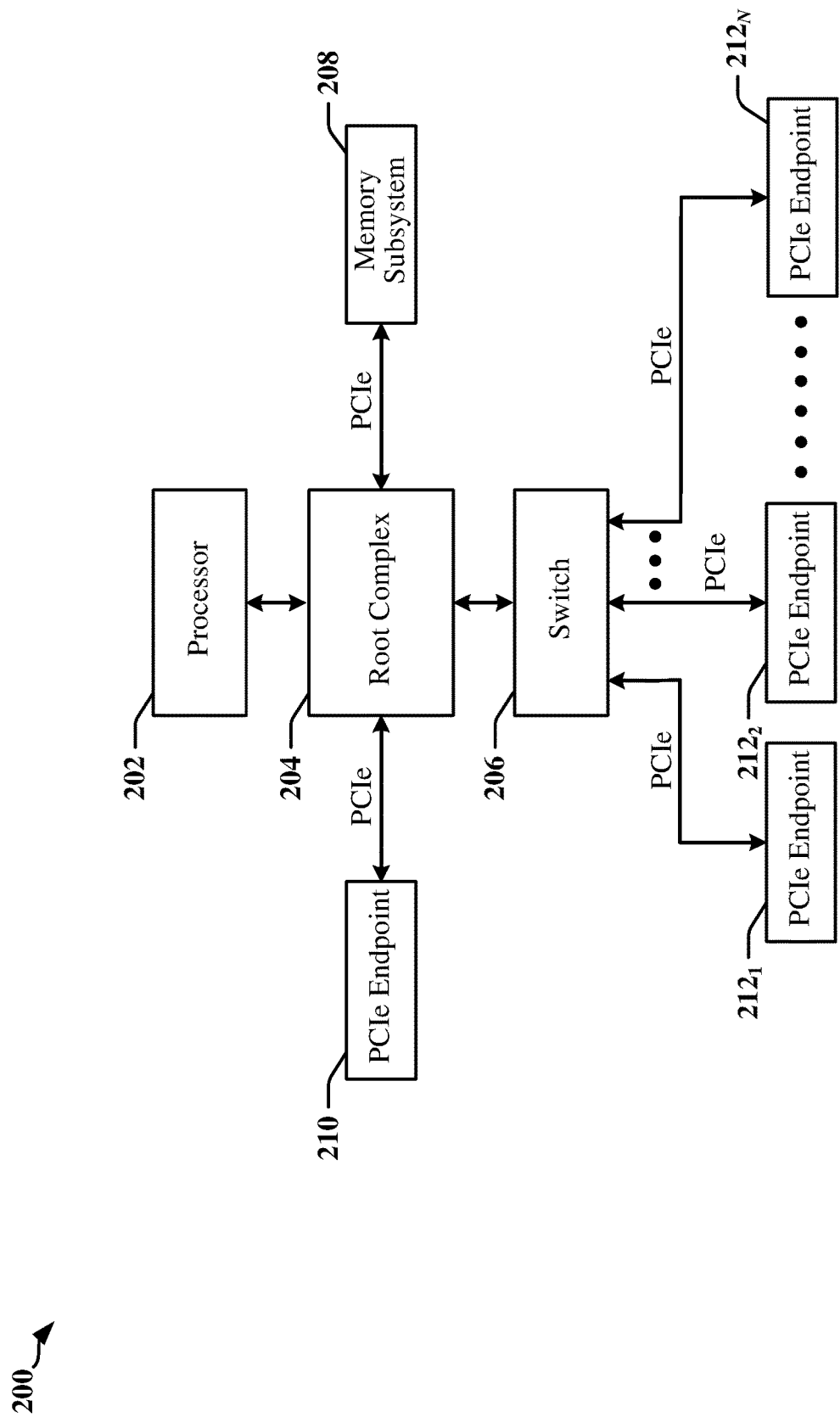
FIG. 2 illustrates an example of an architecture for a PCIe interface.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Computing systems often employ a local bus to connect processors with memory, IC devices, circuits, peripherals, etc. The PCIe interface provides a standardized interface that enables a processor to communicate with a variety of different devices. In some examples, the devices may be provided in a mobile processing device or mobile communication device that communicates over a radio frequency (RF) access network such as a cellular telecommunication network, a local area network based on the Institute of Electrical and Electronics Engineers (IEEE) 802.11 standards, or the like. In some instances, the PCIe interface supports high-speed interconnects that can be deployed within or between IC devices used for RF transceivers, modems, and other components that may be part of a mobile communications device. Mobile communication devices are often subject to power budgets and a PCIe interface may be operated such that transmitters and receivers are powereddown between transmissions. The time required to enter into and exit from a low-power mode of operation can increase the latency of a communication link, where latency may be a measurement of the time interval between receiving a request and transmitting a response to the request. Certain aspects disclosed herein relate to power management of the PCIe interface that can optimize power consumption while maintaining low latency.

Example of a PCIe Implementation

According to certain aspects, a PCIe bus may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device. FIG. 1 depicts an example of such an apparatus 100. The apparatus 100 may include a processing circuit 120 having multiple devices or circuits 122, 124, 126, 128, 136, and/or 138. The processing circuit 120 may be implemented in an application-specific IC (ASIC) or SoC that may include multiple devices or circuits 122, 124, 126, 128, 136, and/or 138. In one example, the apparatus 100 may be a communication device and the processing circuit 120 may include an RF front-end circuit 126 that enables the apparatus to communicate through one or more antennas 140 with a radio access network, a core access network, the Internet and/or another network.

In the example illustrated in FIG. 1, the processing circuit 120 includes an application-specific integrated circuit (ASIC) device 122 that has one or more processors 132, one or more modems 130, and/or other logic circuits or functions. The processing circuit 120 may be controlled by an operating system and may provide an application programming interface (API) layer that enables the one or more processors 132 to execute software modules residing in the memory device 134, for example. The software modules may include instructions and data stored in a processor readable storage such as the memory device 134. The ASIC device 122 may access its internal memory, the memory device 134 of the processing circuit 120, and/or external memory. Memory may include read-only memory (ROM) or random-access memory (RAM), electrically erasable programmable ROM (EEPROM), flash cards, or any memory device that can be used in processing systems and computing platforms. The processing circuit 120 may include, or have access to a local database or other parameter storage that can maintain operational parameters and other information used to configure and operate the apparatus 100 and/or the processing circuit 120. The local database may be implemented using registers, a database module, flash memory, magnetic media, EEPROM, optical media, tape, soft or hard disk, or the like. The processing circuit 120 may also be operably coupled to external devices such as the antennas 140, a display 102, operator controls, such as a button 106 and/or an integrated or external keypad 104, among other components. A user interface 124 may communicate with the display 102, keypad 104, etc. through a dedicated communication link 138 or through one or more PCIe interconnects.

The processing circuit 120 may communicate through a bus interface circuit 128, which may include a combination of circuits, counters, timers, control logic and other configurable circuits or modules. In one example, the bus interface circuit 128 may be configured to operate in accordance with PCIe specifications and protocols. The processing circuit 120 may include or control a power management function that configures and manages the bus interface 128, the user interface 124, the RF front-end circuit 126, and the operation of one or more application processors 132 resident in the ASIC device 122, for example. In certain modes of operation, the bus interface circuit 128 may be configured to transition between power states based on activity of the bus interface 128.

Overview of the PCIe Interface

The PCIe interface operates using multiple high-speed serial links. The PCIe interface may be characterized as having a point-to-point topology, where separate serial links connect each device to a host, or root complex. FIG. 2 is a block diagram illustrating an example of an architecture for a PCIe interface 200. In the PCIe interface 200, the root complex 204 couples a processor 202 to memory devices (e.g. the memory subsystem 208) and a PCIe switch circuit 206. In some instances, the switch circuit 206 includes cascaded switch devices. One or more PCIe endpoint devices 210 may be coupled directly to the root complex 204, while other PCIe endpoint devices $212_1, 212_2, \ldots 212_N$ may be coupled to the the root complex 204 through the PCIe switch circuit 206. The root complex 204 may be coupled to the processor 202 using a proprietary local bus interface or a standards defined local bus interface. The root complex 204 may control operations of the PCIe interface 200, and may generate transaction requests for the processor 202. In some examples, the root complex 204 is implemented in the same IC device that includes the processor 202. A root complex 204 may support multiple PCIe ports.

The root complex 204 may control communication between the processor 202 the memory subsystem 208 and/or other PCIe endpoint devices 210, $212_1, 212_2, \ldots 212_N$. An endpoint device 210, $212_1, 212_2, \ldots$ or $212_N$ may be defined as a device other than the root complex 204 that is capable of requesting or initiating a PCIe transaction, or responding to a PCIe transaction. The PCIe interface 200 may support full-duplex communication between any two endpoints, with no inherent limitation on concurrent access across multiple endpoints.

Information to be communicated using the PCIe interface 200 is encapsulated in packets in accordance with PCIe bus protocols. Devices coupled to a PCIe bus may communicate using one or more PCIe lanes. A PCIe lane may be defined as a point-to-point communication channel between two PCIe ports. A PCIe lane may provide full-duplex communication and may include two differentially encoded pairs of signaling wires or signal traces, with one pair of wires being used for transmitting data and the other pair of wires being used for receiving data. Packets may carry information in eight-bit bytes. In a multi-lane PCIe link, packet data may be striped across multiple lanes. The number of lanes in the multi-lane link may be negotiated during device initialization.

Figure 3:
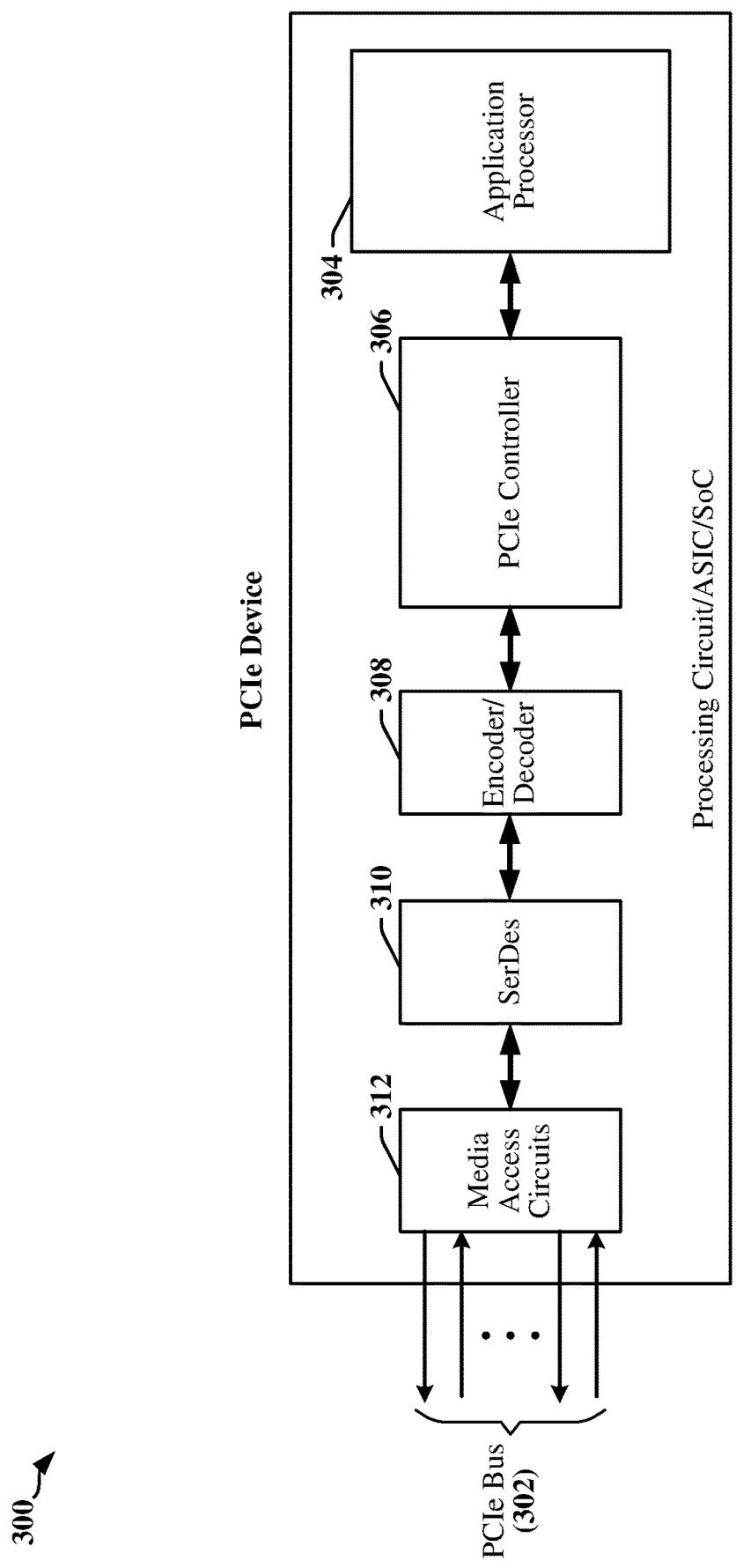
FIG. 3 illustrates an example of a device that may be connected to one or more links or lanes of a PCIe bus in accordance with certain aspects disclosed herein.

FIG. 3 illustrates an example of a PCIe device 300 adapted for connection to one or more links or lanes of a PCIe bus 302. The PCIe device 300 may be implemented on a processing circuit and/or in an ASIC or SoC. An application processor 304 or an interface to a data source and/or data sink may communicate data through the operation of a PCIe controller 306. The PCIe controller 306 may include or be implemented using a microprocessor, a microcontroller, a sequencer, a state machine or some other processing device. The PCIe controller 306 implements PCIe protocols and may be adapted according to certain aspects disclosed herein to monitor activity on the PCIe bus 302 and to maintain parameters for configuring counters and timers that are used to control or optimize certain aspects of the operation of PCIe interface circuits. The PCIe controller 306 may include or cooperate with an encoder/decoder 308 that receives data generated in the application processor 304, and encodes the data for transmission on the PCIe bus 302. The encoder/decoder 308 may data received from the PCIe bus 302 and provide decoded information for delivery to the application processor 304. Serializer/deseralizer circuits (SerDes 310) and media access circuits 312 convert data to bitstreams for transmission in accordance with signaling specifications defined for the PCIe bus 302. The SerDes 310 and the media access circuits 312 convert bitstreams from signals received over the PCIe bus 302 to data that can be decoded and provided to the application processor 304. The media access circuits 312 may include transceivers, clock generators, clock recovery circuits phase-locked loop (PLL) circuits, and the like.

Overview of Power Management in PCIe Interfaces

A PCIe interface 200 may implement an active state power management (ASPM) protocol used to manage PCIe devices based on activity or data traffic levels on PCIe links. The use of ASPM protocols can extend battery life. Power management protocols and algorithms may be configured to reduce overall power consumption by causing the PCIe interface and/or devices coupled to the PCIe interface to enter a low-power state when a PCIe link is idle or otherwise inactive. In some examples, a low power state may be entered by reducing the frequency of a clock used by the PCIe interface 200, or by halting a serial communications transmit or receive clock clock. One or more PCIe devices may be operated at reduced power or disabled during certain low-power states. ASPM can increase latency in data communication due to the exit-latency, where exit-latency corresponds to the time required to wake up and cause the PCIe bus to exit a low-power state, reconfigure the PCIe bus after exit from a low-power state mode, and/or reestablish communications over the PCIe bus.

An ASPM protocol used to manage power consumption in a PCIe interface may define multiple operating states. In one example, the operating states may be defined as a set of states designated as {L0, L1, L2, L3}, for example. The set of states may be implemented using power management circuits and modules. L0 and L1 states may be defined for PCIe interfaces in certain examples described herein. The L0 state may be a fully-active state. In the L1 state, a low power mode of operation may be configured for both directions of the PCIe link. Other states such as an L2 or L3 states may provide reduced power consumption and may be associated with higher exit-latencies. In some instances, additional sub-states may be defined to enable a controller to idle or disable certain circuits and functions in order to consume the least amount of power. In one example, L1.1 and L1.2 states, which may be defined as sub-states of the L1 state, enable a controller to manage certain aspects of device operation in a manner that obtains increased granularity of power control.

Figure 4:
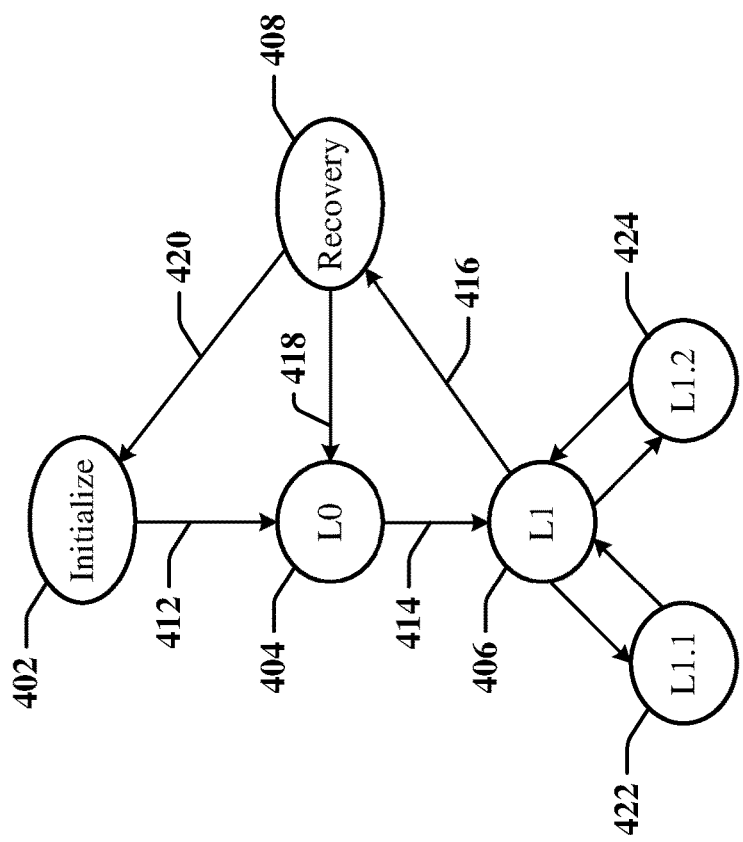
FIG. 4 illustrates an example of a state diagram in accordance with certain aspects disclosed herein.

FIG. 4 is a state diagram 400 illustrating the operation of an ASPM protocol in accordance with certain aspects disclosed herein. In this example an L0 state 404 and an L1 state 406 are illustrated. The ASPM protocol may also support an L1.1 sub-state 422 and an L1.2 sub-state 424. The ASPM protocol may be enabled to reduce power consumption in PCIe devices. An ASPM state change may be initiated when conditions on a link dictate or suggest that a transition between states is desired or necessary. Both communication partners on the link may initiate power state change requests when conditions are right.

In the example illustrated in FIG. 4, the PCIe link may enter an initialization state 402 after a power-on, system reset or after an error condition is detected. In the initialization state 402, device discovery and bus configuration processes may be implemented before the PCIe link transitions 412 to the L0 state 404. In the L0 state 404 PCIe devices may be active and responsive to PCIe transactions, and/or may request or initiate a PCIe transaction. PCIe devices may operate with lowest latency in the L0 state 404. When the PCIe link is idle, PCIe devices operating in the L0 state 404 continue to consume power at the levels consumed during active operation. When the PCIe link is inactive, the PCIe devices may transition 414 to the L1 state 406 in accordance with the ASPM protocol.

The L1 state 406 may enable reductions in power consumption. The L1 state 406 may be entered when a PCIe device determines that there are no outstanding PCIe requests or pending transactions. Reductions in power consumption may permit a mobile communication device, for example, to optimize battery life and better maintain the device within specified or desired thermal operating conditions. Power consumption may be reduced by disabling or idling transceivers in PCIe bus interfaces, disabling, gating, or slowing clocks used by the PCI device, and disabling PLL circuits used to generate clocks used to receive data. A PCIe device may enter the L1 state 406 through the operation of a hardware controller or some combination of operating system and hardware control circuits.

When the PCIe link becomes active while a device is operated in the L1 state 406, a return to the L0 state 404 is initiated for the device. A direct transition to the L0 state 404 may not be available. The PCIe link may transition 416 to a recovery state 408 in which the transceivers in the PCIe bus interfaces, clocks used by the PCI device, and/or PLL circuits are enabled. When the transceivers and other circuits are determined to be functional, then a transition 418 from the recovery state 408 to the L0 state 404 may be initiated. If an error condition is detected in the recovery state 408, a transition 420 from the recovery state 408 to the Initialize state 402 may be necessitated.

Entry into a recovery state 408 can increase the latency of the PCIe link and can result in increased power consumption in the recovery state 408 with respect to the L0 state 404. For example, the time required to synchronize clock signals, obtain a lock in a phase locked loop and establish synchronization between partner devices on a PCIe link may increase power consumption and involve significant delays in responding to bus requests and/or transmitting or receiving data on the PCIe link. In some instances, the increased power consumption may be calculated based on the period of time spent in the recovery state 408. In some instances, the decision to transition 414 into the L1 state 406 from the L0 state 404 is conditioned on one or more thresholds related to idle times, or observed PCIe bus inactivity in order to maximize the probability that the observed inactivity is indicative of a prolonged idle period, in an attempt to ensure that the time spent in the L1 state 406 saves more power than the additional power expended in the recovery state 408.

In some examples, the ASPM protocol determines whether a transition 414 to the L1 state 406 should be initiated based on a finite time interval or threshold defined as the L1 entry latency. The L1 state 406 is a link power state which does not permit data transfers over the PCIe link, and which is a precursor for other link sub-states such as the L1.1 state 422 and L1.2 state 424. In the L1.1 state 422 and the L1.2 state 424, the PCIe interface may consume the least amount of power. Whenever the PCIe link is inactive for the given L1 entry latency duration, a PCIe controller may request a link partner to enter a lower-power link state 406, 422, 424 in order to save power.

In some instances, the L1 entry latency duration is chosen based on overall system parameters, activity and/or pending operations. In some modes of operation, high bandwidth bursts of data traffic are transmitted to transfer data over the PCIe link as quickly as possible. In these cases, the ASPM protocol may be configured to conserve power by reducing the transmission time during which the PCIe link is active and consuming power. Here, the design goal may be directed to avoid link transitions 414 to low power states 406, 422, 424 during high bandwidth bursts that would otherwise extend the transmission time. To accomplish this goal, the ASPM may not initiate a transition 414 until an observed link inactivity time exceeds the worst case latency between data packets in a burst, and/or in response to certain read or write requests.

A variety of system latencies are possible due to complexity of the system architecture and characteristics of devices such as SoCs in which the PCIe interface is deployed. In some examples, the packet latency or interval between data read/write requests in a PCIe interface can vary between 1 μs and 20 μs. When the L1 entry latency duration is too short, more transitions 414 to low power states 406, 422, 424 may occur during a burst, which can result in increased power consumption attributable to the burst and, in some instances, due to an increase in the time to complete the burst due to the time required to exit from low-power states 406, 422, and/or 424. When the L1 entry latency duration is set to the worst case latency, then transitions 414 to low power states 406, 422, and/or 424 may be prevented during low-volume traffic patterns on the PCIe link. When traffic on the PCIe link is low and packet latency duration is greater than the selected L1 entry latency duration, the PCIe link may be prevented from entering the L1 state 406 or other low-power states 422, 424 even when there are no packets to be transmitted over the PCIe link. The PCIe interface may remain active when the PCIe link is idle and power consumption may be unnecessarily high.

Optimizing Exit-Latency and Power Savings

In accordance with certain aspects described herein, the L1 entry latency duration may be adaptively tuned based on observed link conditions. When the L1 entry latency duration varies to match traffic patterns, transitions 414 into the L1 state 406 can be more efficient and power consumption can be optimized. A timer may be used to monitor an idle duration on the PCIe link. The timer may be initialized with, or compared to a current L1 entry latency duration, and a control function in a PCIe device may maintain the timer and the current value of the L1 entry latency duration in registers or counters. In one example, the control function may maintain an L1 entry latency timer and may configure the L1 entry latency duration using hardware such as a counter that may be incremented, decremented, or modified by addition or subtraction when the L1 entry latency duration is to be changed. In another example, the timer and the L1 entry latency duration may be maintained and modified using a combination of a software-driven processor and hardware.

Initially an aggressive L1 entry latency duration can be set by using the lowest value available for L1 entry latency duration. A control function may be configured with a range of possible L1 entry latency values. The lowest L1 entry latency value may maximize the time spent in the low power states 406, 422, 424 and enable a most aggressive power management configuration. At some point, an application, device or system task may initiate a high bandwidth mode of communication over the PCIe link. The high bandwidth mode may attempt to burst out as much data on the PCIe link as possible. Within the burst, there may be short periods of inactivity. Upon detection of the high bandwidth mode, the L1 entry latency duration may be increased to ensure there are no unwanted transitions to a low power state 406, 422, 424 during a burst. The L1 latency duration may not be modified immediately upon detection of the high-bandwidth mode. For example, a PCIe device may record the number of transitions 414 to the lower power states 406, 422, 424 that occur during a burst or some portion of a burst. The PCIe device may modify the L1 entry latency duration if the number of transitions during the burst exceed a threshold maximum number of transitions.

In one example, a PCIe entity that transmits the burst of data over the PCIe link (the transmitter) may count or obtain a count of the number of transitions 414 to the lower power states 406, 422, 424 during the burst of data. The count may be maintained by a PCIe controller 306 which can monitor the number of transitions 414 to the lower power states 406, 422, 424 that occur during the burst. Accordingly, the transmitter may read the number of transitions 414 from a register in the PCIe controller 306 and determine if the L1 entry latency duration should be changed. The L1 entry latency duration may be increased by a percentage, a fixed period of time, or by a number calculated based on link conditions and activity. In one example, the L1 entry latency duration may be increased by a factor of two if the number of transitions 414 exceeds a threshold value. The threshold value may be configured by a system designer or updated based on prior configurations of the L1 entry latency duration and resultant performance of the PCIe link. For a subsequent burst, the number of transitions 414 to the L1 state 406 can be monitored again. If it is determined that the number of transitions remains above the threshold, the next burst can configure the L1 latency timer with an increased L1 entry latency duration. Continuing with the example described above, the L1 entry latency duration may again be doubled from the previous value. A value for configuring the L latency timer can be fixed for the remainder of the burst when an L1 entry latency duration is identified that produces a desired or ideal result, which may be the value that causes fewer transitions 414 to the L1 state 406 than the threshold. In some instances, the L1 latency timer is configured with the most aggressive L1 entry latency value at the beginning of each burst.

According to certain aspects, the value of the L1 entry latency value used to configure the L1 latency timer may be modified continuously, where modifications may result in increases and/or decreases in the L1 entry latency value. For example, the number of transitions 414 to the L1 state 406 may be monitored for every burst. When there are no transitions 414 to the L1 state 406 during a burst, a slightly more aggressive value for the L1 entry latency value can be chosen. In this manner, hysteresis is achieved and the most optimal setting is adaptively tuned based on implementation, calculated system latencies and behavior, and/or observed system latencies and behavior.

Example of a Process for Adaptively Tuning L1 Entry Latency

Figure 5:
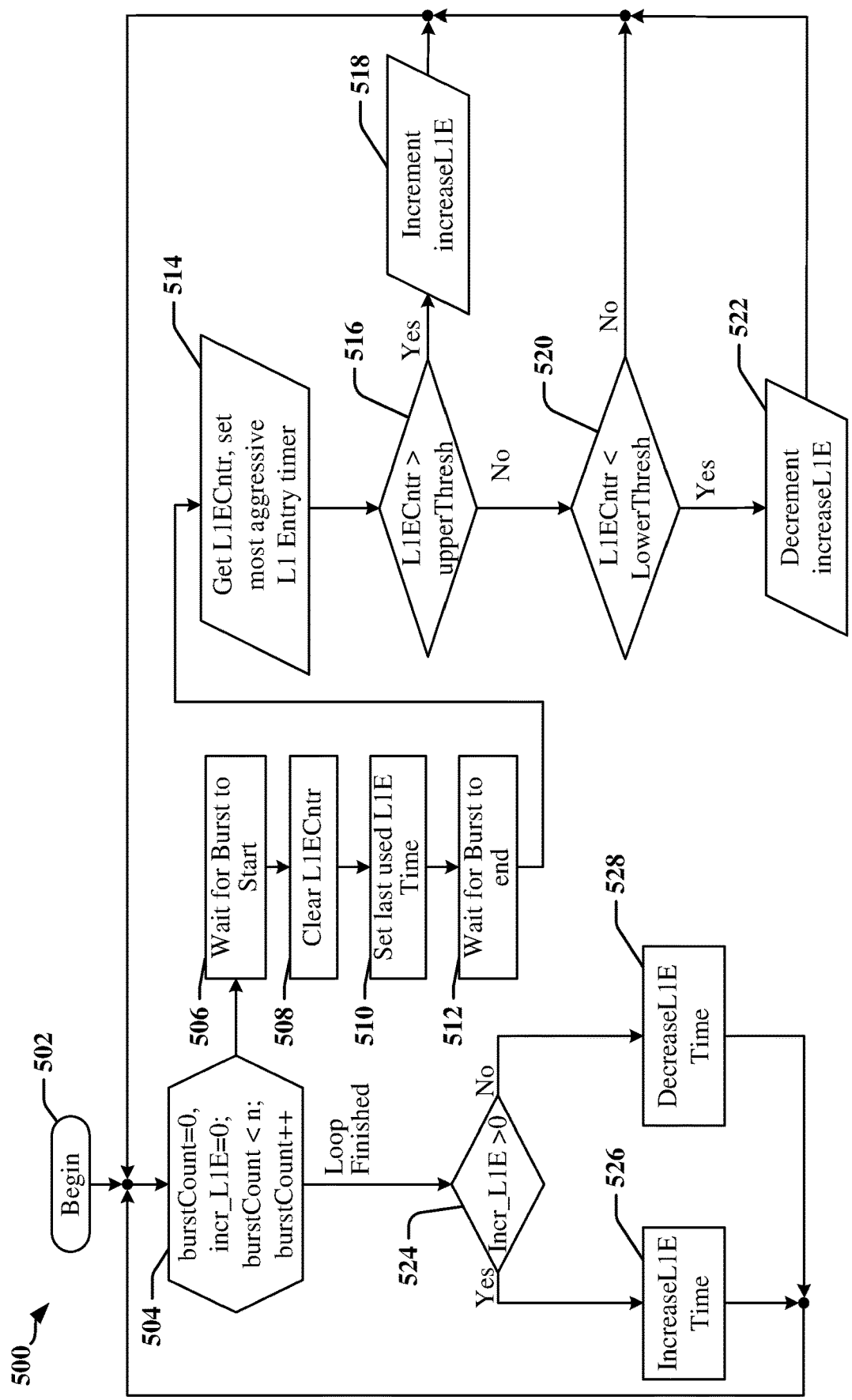
FIG. 5 illustrates an example of an algorithm that may be employed in a method for adaptively tuning a PCIe bus latency in accordance with certain aspects disclosed herein.

FIG. 5 illustrates an example of a method 500 for adaptively tuning L1 entry latency duration. In some examples, the method 500 may be controlled or implemented by the PCIe controller 306. The process may begin at block 502 after entry to the L1 state 406 from the recovery state 408 (see FIG. 4), or after a previous burst transmission on the PCIe link has been completed. The process may involve performing a number of iterations tracked by a loop control parameter (burstCount) which is initialized and managed at block 504. At block 504, a parameter (inc_L1E parameter) that is used to modify the L1 entry latency duration may also be initialized.

At block 506, the PCIe controller 306 may wait until a transmission burst is detected. Then at block 508, the PCIe controller 306 may clear a counter (L1ECntr) used to measure the time between burst transmissions. At block 510, the PCIe controller 306 may configure a value for the L1 entry latency duration. A previously used L1 entry latency duration may be used. In some instances, the PCIe controller 306 may use the most aggressive L1 entry latency duration defined for the PCIe interface. The PCIe controller 306 may then wait at block 512 for the current burst transmission to end.

At block 514, the PCIe controller 306 may read or otherwise obtain the value recorded in the L1ECntr, which measures idle time within a burst transmission. At block 516, the value of L1ECntr is compared to an upper threshold value. If the L1ECntr exceeds the upper threshold value, the PCIe controller 306 may increment the inc_L1E parameter at block 518 and return to begin the next iteration at block 504. If the L1ECntr is not greater than the upper threshold value, then at block 520, the PCIe controller 306 may compare the value of L1ECntr to a lower threshold value. If the L1ECntr is less than the lower threshold value, the PCIe controller 306 may decrement the inc_L1E parameter and return to begin the next iteration at block 504. If the L1ECntr is not less than the lower threshold value, the PCIe controller 306 may return to begin the next iteration at block 504.

When the loop initiated at block 504 has been completed, the PCIe controller 306 may evaluate the inc_L1E parameter at block 524. If the inc_L1E parameter has a positive value, then the PCIe controller 306 may increase the L1 entry latency duration. In one example, the L1 entry latency duration may be doubled. In another example the L1 entry latency duration may be increased by a configured percentage or by an absolute value. If at block 524 the PCIe controller 306 determines that the inc_L1E parameter does not have a positive value, then the the PCIe controller 306 may decrease the L1 entry latency duration. In one example, the L1 entry latency duration may be halved. In another example the L1 entry latency duration may be reduced by a configured percentage or by an absolute value. In another example, the PCIe controller 306 may revert to a previously used value for the L entry latency duration.

Examples of Processing Circuits and Methods

Figure 6:
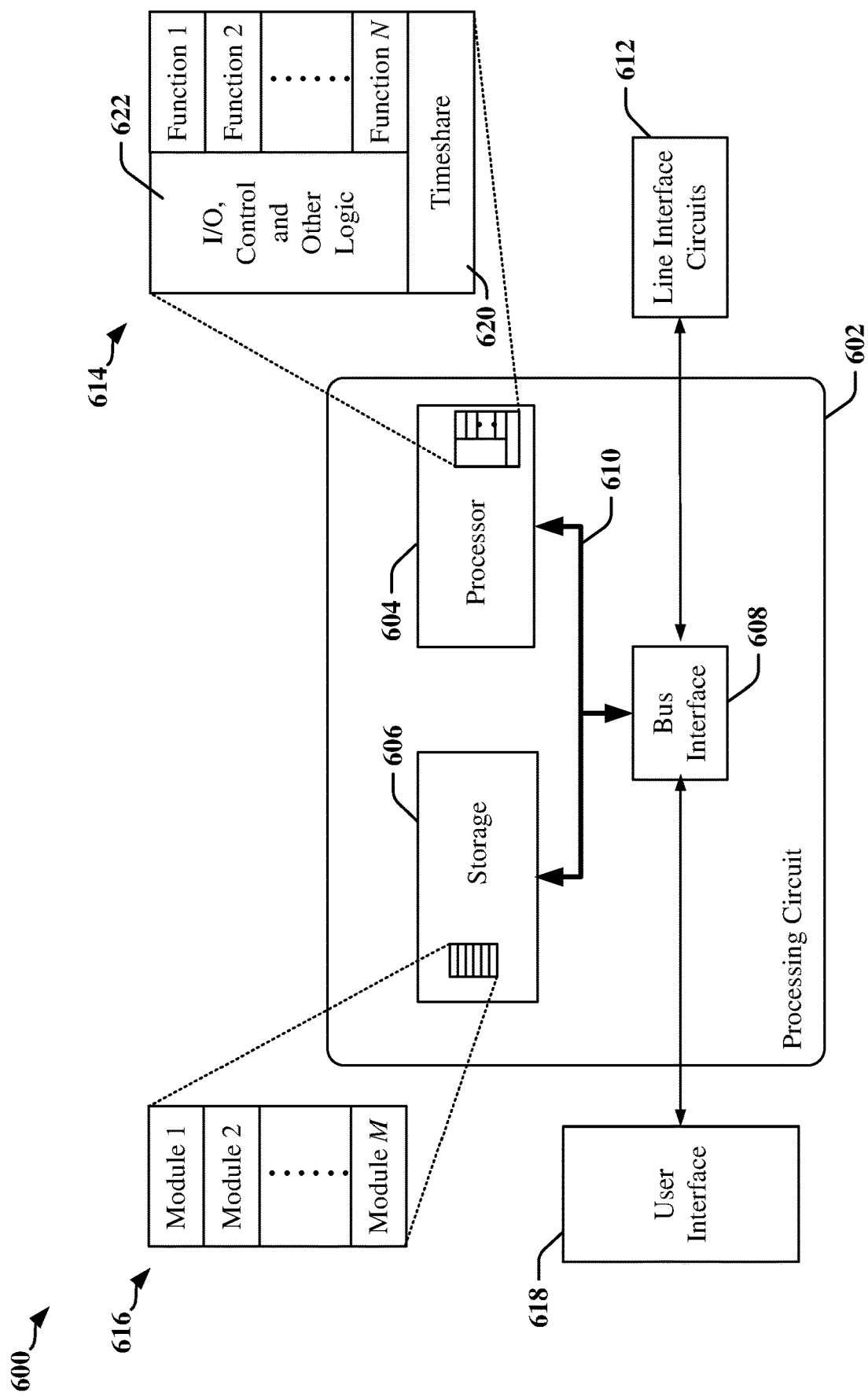
FIG. 6 is a block diagram illustrating an example of an apparatus employing a processing circuit that may be adapted according to certain aspects disclosed herein.

FIG. 6 is a diagram illustrating an example of a hardware implementation for an apparatus 600 employing a processing circuit 602 that may be configured to perform one or more functions disclosed herein. In accordance with various aspects of the disclosure, an element, or any portion of an element, or any combination of elements as disclosed herein may be implemented using the processing circuit 602. The processing circuit 602 may include one or more processors 604 that are controlled by some combination of hardware and software modules. Examples of processors 604 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 604 may include specialized processors that perform specific functions, and that may be configured, augmented or controlled by one of the software modules 616. The one or more processors 604 may be configured through a combination of software modules 616 loaded during initialization, and further configured by loading or unloading one or more software modules 616 during operation.

In the illustrated example, the processing circuit 602 may be implemented with a bus architecture, represented generally by the bus 610. The bus 610 may include any number of interconnecting buses and bridges depending on the specific application of the processing circuit 602 and the overall design constraints. The bus 610 links together various circuits including the one or more processors 604, and storage 606. Storage 606 may include memory devices and mass storage devices, and may be referred to herein as computer-readable media and/or processor-readable media. The bus 610 may also link various other circuits such as timing sources, timers, peripherals, voltage regulators, and power management circuits. A bus interface 608 may provide an interface between the bus 610 and one or more transceivers 612. A transceiver 612 may be provided for each networking technology supported by the processing circuit. In some instances, multiple networking technologies may share some or all of the circuitry or processing modules found in a transceiver 612. Each transceiver 612 provides a means for communicating with various other apparatus over a transmission medium. Depending upon the nature of the apparatus 600, a user interface 618 (e.g., keypad, display, speaker, microphone, joystick) may also be provided, and may be communicatively coupled to the bus 610 directly or through the bus interface 608.

A processor 604 may be responsible for managing the bus 610 and for general processing that may include the execution of software stored in a computer-readable medium that may include the storage 606. In this respect, the processing circuit 602, including the processor 604, may be used to implement any of the methods, functions and techniques disclosed herein. The storage 606 may be used for storing data that is manipulated by the processor 604 when executing software, and the software may be configured to implement any one of the methods disclosed herein.

One or more processors 604 in the processing circuit 602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 606 or in an external computer-readable medium. The external computer-readable medium and/or storage 606 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 606 may also include, by way of example, a carrier wave, a transmission line, and any other suitable medium for transmitting software and/or instructions that may be accessed and read by a computer. Computer-readable medium and/or the storage 606 may reside in the processing circuit 602, in the processor 604, external to the processing circuit 602, or be distributed across multiple entities including the processing circuit 602. The computer-readable medium and/or storage 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 606 may maintain software maintained and/or organized in loadable code segments, modules, applications, programs, etc., which may be referred to herein as software modules 616. Each of the software modules 616 may include instructions and data that, when installed or loaded on the processing circuit 602 and executed by the one or more processors 604, contribute to a run-time image 614 that controls the operation of the one or more processors 604. When executed, certain instructions may cause the processing circuit 602 to perform functions in accordance with certain methods, algorithms and processes described herein.

Some of the software modules 616 may be loaded during initialization of the processing circuit 602, and these software modules 616 may configure the processing circuit 602 to enable performance of the various functions disclosed herein. For example, some software modules 616 may configure internal devices and/or logic circuits 622 of the processor 604, and may manage access to external devices such as the transceiver 612, the bus interface 608, the user interface 618, timers, mathematical coprocessors, and so on. The software modules 616 may include a control program and/or an operating system that interacts with interrupt handlers and device drivers, and that controls access to various resources provided by the processing circuit 602. The resources may include memory, processing time, access to the transceiver 612, the user interface 618, and so on.

One or more processors 604 of the processing circuit 602 may be multifunctional, whereby some of the software modules 616 are loaded and configured to perform different functions or different instances of the same function. The one or more processors 604 may additionally be adapted to manage background tasks initiated in response to inputs from the user interface 618, the transceiver 612, and device drivers, for example. To support the performance of multiple functions, the one or more processors 604 may be configured to provide a multitasking environment, whereby each of a plurality of functions is implemented as a set of tasks serviced by the one or more processors 604 as needed or desired. In one example, the multitasking environment may be implemented using a timesharing program 620 that passes control of a processor 604 between different tasks, whereby each task returns control of the one or more processors 604 to the timesharing program 620 upon completion of any outstanding operations and/or in response to an input such as an interrupt. When a task has control of the one or more processors 604, the processing circuit is effectively specialized for the purposes addressed by the function associated with the controlling task. The timesharing program 620 may include an operating system, a main loop that transfers control on a round-robin basis, a function that allocates control of the one or more processors 604 in accordance with a prioritization of the functions, and/or an interrupt driven main loop that responds to external events by providing control of the one or more processors 604 to a handling function.

Figure 7:
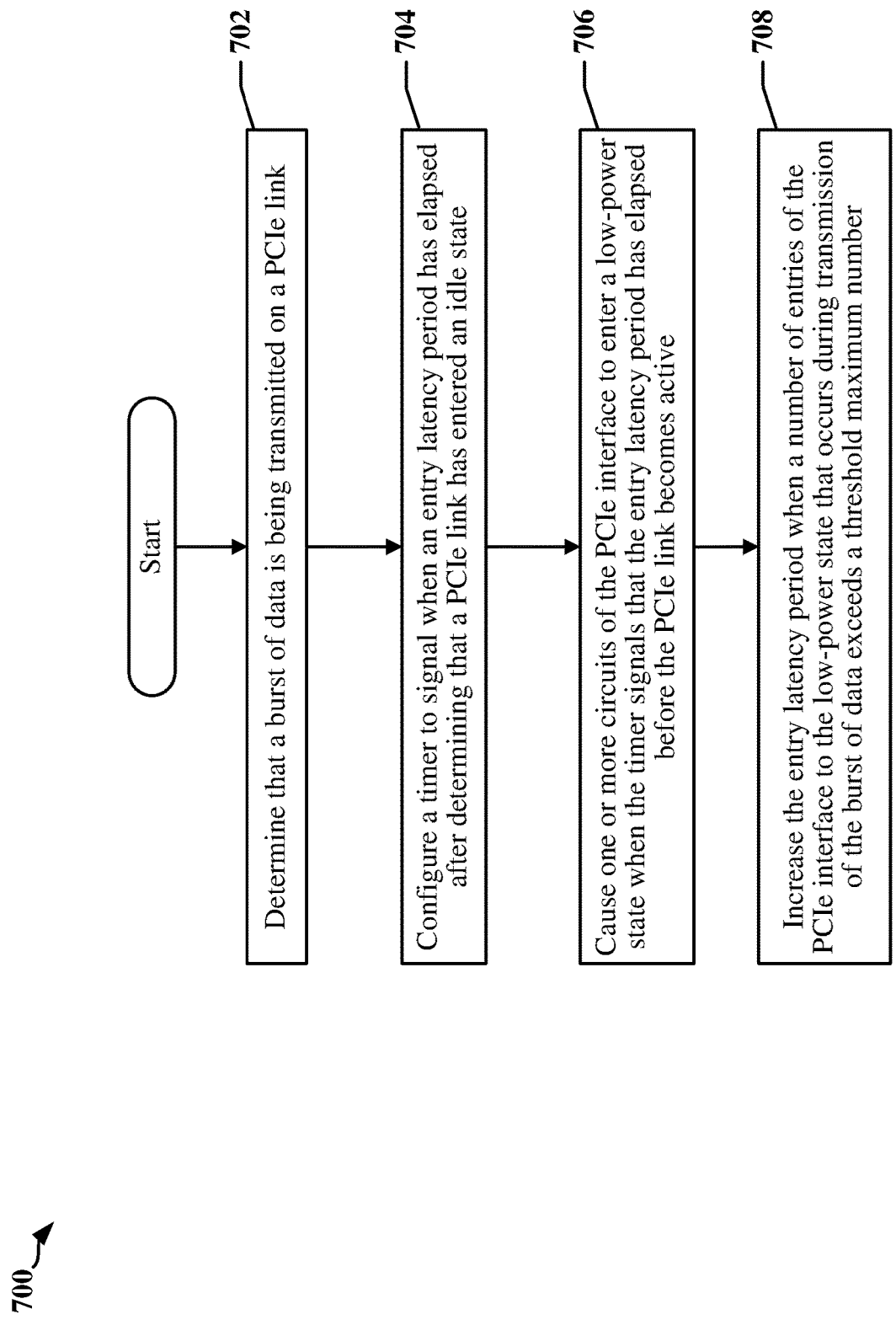
FIG. 7 is a flowchart of a method for adaptively tuning a PCIe bus latency in accordance with certain aspects disclosed herein.

FIG. 7 is a flowchart 700 of a method for adaptively modifying latency times governing entry of a PCIe interface into low power states. The method may be performed at a PCIe controller 306 (see FIG. 3).

At block 702, the PCIe controller 306 may determine that a burst of data is being transmitted on a PCIe link.

At block 704, the PCIe controller 306 may configure a timer to signal when an entry latency period has elapsed after determining that a PCIe link has entered an idle state.

At block 706, the PCIe controller 306 may cause one or more circuits of the PCIe interface to enter a low-power state when the timer signals that the entry latency period has elapsed before the PCIe link becomes active. Causing one or more circuits of the PCIe interface to enter the low-power state may include disabling one or more circuits of a transceiver coupled to the PCIe interface. Causing one or more circuits of the PCIe interface to enter the low-power state may include slowing, disabling or gating a clock signal used by one or more circuits of the PCIe interface. Causing one or more circuits of the PCIe interface to enter the low-power state may include causing circuits in two or more devices coupled to the PCIe interface to enter the low power state.

At block 708, the PCIe controller 306 may increase the entry latency period when a number of entries of the PCIe interface to the low-power state that occurs during transmission of the burst of data exceeds a threshold maximum number. The entry latency period may be increased by doubling the entry latency period.

In some instances, the PCIe controller 306 may decrease the entry latency period when the number of entries of the PCIe interface to the low-power state that occurs during transmission of the burst of data is less than a threshold minimum number. In one example, the entry latency period may be decreases when the PCIe interface does not enter the low-power state during transmission of the burst of data (i.e. the threshold minimum number is 1). The entry latency period may be decreased by halving the entry latency period. The entry latency period may be decreased restoring a previous time period used for the entry latency period.

Figure 8:
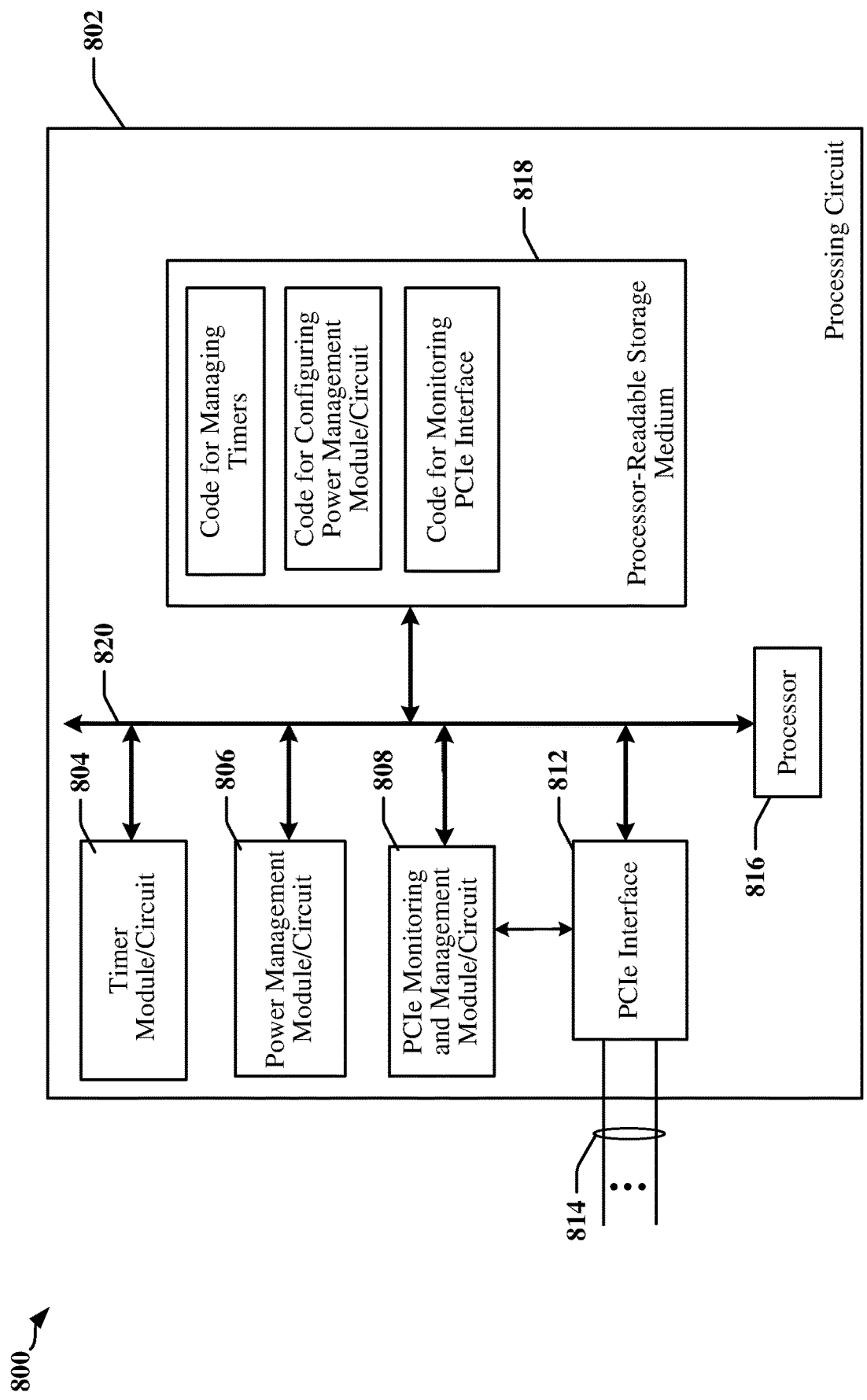
FIG. 8 is a diagram illustrating an example of a hardware implementation for an apparatus that adaptively tunes a PCIe bus latency in accordance with certain aspects disclosed herein.

FIG. 8 is a diagram illustrating a simplified example of a hardware implementation for an apparatus 800 employing a processing circuit 802. The processing circuit typically has a controller or processor 816 that may include one or more microprocessors, microcontrollers, digital signal processors, sequencers and/or state machines. The processing circuit 802 may be implemented with a bus architecture, represented generally by the bus 820. The bus 820 may include any number of interconnecting buses and bridges depending on the specific application of the processing circuit 802 and the overall design constraints. The bus 820 links together various circuits including one or more processors and/or hardware modules, represented by the controller or processor 816, the modules or circuits 804, 806 and 808 and the computer-readable storage medium 818. The apparatus may have a PCIe Interface 812 adapted to communicate over a plurality of interconnects or wires of a PCIe link 814. In one example, the PCIe Interface 812 may be a Type-C connector adapted to couple the apparatus 800 to another device in accordance with one or more USB protocols The bus 820 may also link various other circuits such as timing sources, peripherals, voltage regulators, and power management circuits, which are well known in the art, and therefore, will not be described any further.

The processor 816 is responsible for general processing, including the execution of software, code and/or instructions stored on the computer-readable storage medium 818. The computer-readable storage medium may include a non-transitory storage medium. The software, when executed by the processor 816, causes the processing circuit 802 to perform the various functions described supra for any particular apparatus. The computer-readable storage medium may be used for storing data that is manipulated by the processor 816 when executing software, including software, code and/or instructions loaded through the PCIe Interface 812. The processing circuit 802 further includes at least one of the modules 804, 806 and 808. The modules 804, 806 and 808 may be software modules running in the processor 816, resident/stored in the computer-readable storage medium 818, one or more hardware modules coupled to the processor 816, or some combination thereof. The modules 804, 806 and/or 808 may include microcontroller instructions, state machine configuration parameters, or some combination thereof.

In one configuration, the apparatus 800 includes a PCIe Interface 812, one or more timer modules or circuits 804, a power management module or circuit 806 and PCIe link monitoring and management modules or circuits 808. The PCIe Interface 812 may be configured to couple the apparatus to the PCIe link 814. The power management module or circuit 806 and the PCIe link monitoring and management modules or circuits 808 may be implemented using a PCIe controller 306, for example. During a burst of data transmitted on the PCIe link 814, the PCIe link monitoring and management modules or circuits 808 may be configured to determine when the PCIe link has entered an idle state. The PCIe controller 306 may enable one of the timer modules or circuits 804, which may be adapted to signal when an entry latency period has elapsed after determining that the PCIe link 814 has entered the idle state. The power management module or circuit 806 may cause one or more circuits of the PCIe interface 812 to enter a low-power state when the timer modules or circuits 804 signals that the entry latency period has elapsed before the PCIe link 814 or PCIe interface 812 becomes active.

In some embodiments, the entry latency period may be increased when the number of entries of the PCIe interface to the low-power state occurring during transmission of the burst of data exceeds a threshold maximum number. In one example, increasing the entry latency period includes doubling the entry latency period. In another example, increasing the entry latency period includes adding a period of time calculated based on PCIe bus activity.

In some embodiments, the entry latency period may be decreased when the PCIe interface does not enter the low-power state during transmission of the burst of data. In one example, the entry latency period may be decreased when the number of entries of the PCIe interface to the low-power state that occurs during transmission of the burst of data is less than a threshold minimum number. The entry latency duration may be decreased by a configured percentage or time increment. For example, the entry latency period may be halved. In some examples, the entry latency duration may be restored to a previous time period used for the entry latency period.

In some examples, the PCIe interface enters the low-power state by disabling one or more circuits of a transceiver coupled to the PCIe interface. In some examples, the PCIe interface enters the low-power state by disabling or gating a clock signal used by one or more circuits of the PCIe interface. In some examples, the PCIe interface enters the low-power state by disabling a PLL circuit, a clock generation circuit and/or a clock extraction circuit. In some examples, the PCIe interface enters the low-power state by slowing the frequency of a clock signal used by one or more circuits of the PCIe interface. Two or more devices coupled to the PCIe interface may be caused to enter the low power state.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method performed by a controller of a Peripheral Component Interconnect Express (PCIe) interface, comprising:

determining that a first burst of data is being transmitted on a PCIe link, wherein the data in the first burst of data is encapsulated in a plurality of packets configured in accordance with a PCIe bus protocol;

configuring a timer to signal when an entry latency period has elapsed after determining that the PCIe link has entered an idle state after completing transmission of a first packet in the plurality of packets;

causing one or more circuits of the PCIe interface to enter a low-power state when the timer signals that the entry latency period has elapsed before the PCIe link becomes active, wherein the PCIe link becomes active when a second packet in the plurality of packets is available for transmission;

increasing the entry latency period when a number of entries of the PCIe interface to the low-power state that occurs during transmission of the first burst of data exceeds a first threshold that defines a maximum number of entries into the low-power state per burst of data; and updating the first threshold based on performance of the PCIe link, including the number of entries of the PCIe interface to the low-power state counted during transmission of the first burst, thereby obtaining an updated first threshold to be used in a subsequent second burst.

2. The method of claim 1, wherein increasing the entry latency period comprises:
doubling the entry latency period.

3. The method of claim 1, further comprising:
decreasing the entry latency period when the PCIe interface does not enter the low-power state between transmissions of a pair of packets in the plurality of packets.

4. The method of claim 1, further comprising:
decreasing the entry latency period when the number of entries of the PCIe interface to the low-power state that occurs during transmission of the first burst of data is less than a second threshold that defines a minimum number of entries into the low-power state per burst of data; and
updating the second threshold based on performance of the PCIe link, including the number of entries of the PCIe interface to the low-power state counted during transmission of the first burst, thereby obtaining an updated second threshold to be used in the subsequent second burst.

5. The method of claim 4, wherein decreasing the entry latency period comprises:
halving the entry latency period.

6. The method of claim 4, wherein decreasing the entry latency period comprises:
restoring a previous time period used for the entry latency period.

7. The method of claim 1, wherein causing one or more circuits of the PCIe interface to enter the low-power state comprises:
disabling one or more circuits of a transceiver coupled to the PCIe interface.

8. The method of claim 1, wherein causing one or more circuits of the PCIe interface to enter the low-power state comprises:
disabling or gating a clock signal used by one or more circuits of the PCIe interface.

9. The method of claim 1, wherein causing one or more circuits of the PCIe interface to enter the low-power state comprises:
causing circuits in two or more devices coupled to the PCIe interface to enter the low-power state.

10. An apparatus comprising:
a Peripheral Component Interconnect Express (PCIe) interface adapted to couple the apparatus to a PCIe link; and
a controller configured to determine that a first burst of data is being transmitted on the PCIe link, wherein the data in the first burst of data is encapsulated in a plurality of packets configured in accordance with a PCIe bus protocol, and wherein during transmission of the first burst of data the controller is further configured to:
determine when the PCIe link has entered an idle state;
enable a timer adapted to signal when an entry latency period has elapsed after determining that the PCIe link has entered the idle state after completing transmission of a first packet in the plurality of packets;
cause one or more circuits of the PCIe interface to enter a low-power state when the timer signals that the entry latency period has elapsed before the PCIe link becomes active, wherein the PCIe link becomes active when a second packet in the plurality of packets is available for transmission;
increase the entry latency period when a number of entries of the PCIe interface to the low-power state that occurs during transmission of the first burst of data exceeds a first threshold that defines a maximum number of entries into the low-power state per burst of data; and
update the first threshold based on performance of the PCIe link, including the number of entries of the PCIe interface to the low-power state counted during transmission of the first burst, thereby obtaining an updated first threshold to be used in a subsequent second burst.

11. The apparatus of claim 10, wherein the controller is configured to:
increase the entry latency period comprises double the entry latency period.

12. The apparatus of claim 10, wherein the controller is configured to:
decrease the entry latency period when the PCIe interface does not enter the low-power state between transmissions of a pair of packets in the plurality of packets.

13. The apparatus of claim 10, wherein the controller is configured to:
decrease the entry latency period when the number of entries of the PCIe interface to the low-power state that occurs during transmission of the first burst of data is less than a second threshold that defines a minimum number of entries into the low-power state per burst of data; and
update the second threshold based on performance of the PCIe link, including the number of entries of the PCIe interface to the low-power state counted during transmission of the first burst, thereby obtaining an updated second threshold to be used in the subsequent second burst.

14. The apparatus of claim 13, wherein the controller is configured to:
decrease the entry latency period by halving the entry latency period.

15. The apparatus of claim 13, wherein the controller is configured to:
decrease the entry latency period by restoring a previous time period used for the entry latency period.

16. The apparatus of claim 10, wherein the controller is configured to:
cause the one or more circuits of the PCIe interface to enter the low-power state by disabling one or more circuits of a transceiver coupled to the PCIe interface.

17. The apparatus of claim 10, wherein the controller is configured to:
cause the one or more circuits of the PCIe interface to enter the low-power state by disabling or gating a clock signal used by one or more circuits of the PCIe interface.

18. The apparatus of claim 10, wherein the controller is configured to:
cause the one or more circuits of the PCIe interface to enter the low-power state by causing circuits in two or more devices coupled to the PCIe interface to enter the low-power state.

19. An apparatus comprising:
means for determining activity on a PCIe link, including determining when a first burst of data is being transmitted on the PCIe link, wherein the data in the first burst of data is encapsulated in a plurality of packets configured in accordance with a PCIe bus protocol;

means for managing power consumption in a Peripheral Component Interconnect Express (PCIe) interface, and configured to transition the PCIe interface between at least a first state and a second state;

means for configuring a timer, wherein the means for configuring the timer is adapted to signal when an entry latency period has elapsed after the means for determining activity on the PCIe link has determined that the PCIe link has entered an idle state between transmissions of a first pair of packets in the first burst of data transmitted on the PCIe link; and means for modifying the entry latency period based on a number of entries of the PCIe interface to a low-power state that occurs during transmission of the first burst of data, wherein the means for modifying the entry latency period is configured to:

increase the entry latency period when a number of entries of the PCIe interface to the low-power state that occurs during transmission of the first burst of data exceeds a first threshold that defines a maximum number of entries into the low-power state per burst of data; and update the first threshold based on performance of the PCIe link, including the number of entries of the PCIe interface to the low-power state counted during transmission of the first burst, thereby obtaining an updated first threshold to be used in a subsequent second burst, wherein the means for managing power consumption is configured to cause one or more circuits of the PCIe interface to enter the low-power state when the timer signals that the entry latency period has elapsed before the PCIe link becomes active.

20. The apparatus of claim 19, wherein the means for modifying the entry latency period is configured to:
increase the entry latency period by doubling the entry latency period.

21. The apparatus of claim 19, wherein the means for modifying the entry latency period is configured to:
halve the entry latency period when the PCIe interface does not enter the low-power state during transmission between transmissions of a second pair of packets in the plurality of packets.

22. The apparatus of claim 19, wherein the means for modifying the entry latency period is configured to:
restore a previous time period used for the entry latency period when the PCIe interface does not enter the low-power state during transmission of the first burst of data.

23. The apparatus of claim 19, wherein the means for modifying the entry latency period is configured to:
halve the entry latency period when the number of entries of the PCIe interface to the low-power state that occurs during transmission of the first burst of data is less than a second threshold that defines a minimum number of entries into the low-power state per burst of data.

24. The apparatus of claim 19, wherein the means for modifying the entry latency period is configured to:
restore a previous time period used for the entry latency period when the number of entries of the PCIe interface to the low-power state that occurs during transmission of the first burst of data is less than a second threshold that defines a minimum number of entries into the low-power state per burst of data.

25. The apparatus of claim 19, wherein the means for managing power consumption is configured to:
disable a transceiver coupled to the PCIe interface when the timer signals that the entry latency period has elapsed before the PCIe link becomes active.

26. The apparatus of claim 19, wherein the means for managing power consumption is configured to:
gate a clock signal used by one or more circuits of the PCIe interface when the timer signals that the entry latency period has elapsed before the PCIe link becomes active.

27. The apparatus of claim 19, wherein the means for managing power consumption is configured to:
cause circuits in two or more devices coupled to the PCIe interface to enter the low-power state when the timer signals that the entry latency period has elapsed before the PCIe link becomes active.

28. A non-transitory processor-readable storage medium comprising code for:
determining that a first burst of data is being transmitted on a Peripheral Component Interconnect Express (PCIe) link, wherein the data in the first burst of data is encapsulated in a plurality of packets configured in accordance with a PCIe bus protocol;

configuring a timer to signal when an entry latency period has elapsed after determining that the PCIe link has entered an idle state after completing transmission of a first packet in the plurality of packets;

causing one or more circuits of a PCIe interface to enter a low-power state when the timer signals that the entry latency period has elapsed before the PCIe link becomes active, wherein the PCIe link becomes active when a second packet in the plurality of packets is available for transmission;

increasing the entry latency period when a number of entries of the PCIe interface to the low-power state that occurs during transmission of the first burst of data exceeds a first threshold that defines a maximum number of entries into the low-power state per burst of data; and updating the first threshold based on performance of the PCIe link, including the number of entries of the PCIe interface to the low-power state counted during transmission of the first burst, thereby obtaining an updated first threshold to be used in a subsequent second burst.

29. The storage medium of claim 28, comprising code for:
decreasing the entry latency period when the number of entries of the PCIe interface to the low-power state that occurs during transmission of the first burst of data is less than a second threshold that defines a minimum number of entries into the low-power state per burst of data; and updating the second threshold based on performance of the PCIe link, including the number of entries of the PCIe interface to the low-power state counted during transmission of the first burst, thereby obtaining an updated second threshold to be used in the subsequent second burst.

30. The storage medium of claim 29, comprising code for:
causing circuits in two or more devices coupled to the PCIe interface to enter the low-power state when the timer signals that the entry latency period has elapsed before the PCIe link becomes active.

* * * * *